United States Patent
Lin et al.

(10) Patent No.: US 9,953,425 B2
(45) Date of Patent: Apr. 24, 2018

(54) LEARNING IMAGE CATEGORIZATION USING RELATED ATTRIBUTES

(71) Applicant: ADOBE SYSTEMS INCORPORATED, San Jose, CA (US)

(72) Inventors: Zhe Lin, Fremont, CA (US); Hailin Jin, San Jose, CA (US); Jianchao Yang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 129 days.

(21) Appl. No.: 14/447,296

(22) Filed: Jul. 30, 2014

(65) Prior Publication Data
US 2016/0034788 A1    Feb. 4, 2016

(51) Int. Cl.
G06N 3/04    (2006.01)
G06T 7/00    (2017.01)
G06K 9/62    (2006.01)

(52) U.S. Cl.
CPC ............ G06T 7/0042 (2013.01); G06K 9/627 (2013.01); G06N 3/0454 (2013.01)

(58) Field of Classification Search
CPC .... G06K 9/4628; G06K 2209/01; G06K 9/66; G06K 9/6267; G06K 9/4604; G06N 3/08; G06N 3/04; G06N 99/005; G06N 3/0454; G06N 3/063; G06T 7/0012; G06T 2207/10081; G06T 2207/20084; G06T 2207/20081
See application file for complete search history.

(56) References Cited

U.S. PATENT DOCUMENTS

| 7,499,588 B2 * | 3/2009 | Jacobs ............... G06K 9/00463 382/173 |
| 8,379,961 B2 * | 2/2013 | Cosatto .............. G06K 9/00147 382/100 |
| 8,442,321 B1 | 5/2013 | Chang et al. |
| 8,798,375 B1 | 8/2014 | Chang |
| 8,879,813 B1 | 11/2014 | Solanki et al. |
| 9,015,083 B1 | 4/2015 | Monga et al. |
| 9,031,844 B2 | 5/2015 | Yu et al. |
| 9,324,022 B2 | 4/2016 | Williams, Jr. et al. |

(Continued)

OTHER PUBLICATIONS

Karayev et al, Recognizing Image Style [database online], May 23, 2014 [retrieved Mar. 25, 2016],pp. 1-22, retrived from the Internet<URL: http://arxiv.org/abs/1311.3715v2>.*

(Continued)

*Primary Examiner* — Andrew Moyer
*Assistant Examiner* — Dennis Rosario
(74) *Attorney, Agent, or Firm* — Shook, Hardy & Bacon L.L.P.

(57) ABSTRACT

A first set of attributes (e.g., style) is generated through pre-trained single column neural networks and leveraged to regularize the training process of a regularized double-column convolutional neural network (RDCNN). Parameters of the first column (e.g., style) of the RDCNN are fixed during RDCNN training. Parameters of the second column (e.g., aesthetics) are fine-tuned while training the RDCNN and the learning process is supervised by the label identified by the second column (e.g., aesthetics). Thus, features of the images may be leveraged to boost classification accuracy of other features by learning a RDCNN.

20 Claims, 9 Drawing Sheets

(56) References Cited

U.S. PATENT DOCUMENTS

| | | | |
|---|---|---|---|
| 9,373,059 | B1 | 6/2016 | Heifets et al. |
| 9,443,192 | B1 | 9/2016 | Cosic |
| 2005/0213499 | A1 | 9/2005 | Boyce |
| 2009/0003459 | A1 | 1/2009 | Limberg |
| 2012/0065976 | A1 | 3/2012 | Deng et al. |
| 2014/0376819 | A1 | 12/2014 | Liu et al. |
| 2015/0117760 | A1 | 4/2015 | Wang et al. |
| 2015/0139536 | A1 | 5/2015 | Jin et al. |
| 2015/0142704 | A1 | 5/2015 | London |
| 2015/0178554 | A1 | 6/2015 | Kanaujia et al. |
| 2015/0278642 | A1 | 10/2015 | Chertok et al. |
| 2015/0294219 | A1* | 10/2015 | Krizhevsky ............ G06N 3/084 706/25 |
| 2015/0317511 | A1 | 11/2015 | Li |
| 2015/0324655 | A1 | 11/2015 | Chalasani et al. |
| 2015/0339570 | A1 | 11/2015 | Scheffler |
| 2016/0034788 | A1 | 2/2016 | Lin et al. |
| 2016/0034809 | A1 | 2/2016 | Trenholm et al. |
| 2016/0035078 | A1 | 2/2016 | Lin et al. |
| 2016/0055409 | A1 | 2/2016 | Majumdar et al. |
| 2016/0070673 | A1 | 3/2016 | Wang et al. |
| 2016/0071005 | A1 | 3/2016 | Wang et al. |
| 2016/0140438 | A1 | 5/2016 | Yang et al. |
| 2016/0148080 | A1 | 5/2016 | Yoo et al. |
| 2016/0180195 | A1 | 6/2016 | Martinson et al. |
| 2016/0180200 | A1 | 6/2016 | Vijayanarasimhan et al. |
| 2016/0196480 | A1 | 7/2016 | Heifets et al. |
| 2016/0217369 | A1 | 7/2016 | Annapureddy et al. |
| 2016/0224903 | A1 | 8/2016 | Talathi et al. |
| 2016/0239706 | A1 | 8/2016 | Dijkman et al. |
| 2016/0239736 | A1 | 8/2016 | Sarah |

OTHER PUBLICATIONS

Sermanet et al., OverFeat: Integrated Recognition, Localization and Detection using Convolutional Networks [database online], Feb 24, 2014 [retrieved Mar. 25, 2016],pp. 1-16, retrived from the Internet<URL: http://arxiv.org/abs/1312.6229>.*

Karayev et al., Recognizing Image Style: Tech Report [database online], Nov 15, 2013 [retrieved Mar. 25, 2016],pp. 1-10, retrieved from the Internet<URL:http://arxiv.org/abs/1311.3715v1>.*

Krizhevsky et al., ImageNet Classification with Deep Convolutional Neural Networks [database online], 2012 [retrived Mar. 24, 2016],pp. 1-11, retrieved from the Internet<URL: http://papers.nips.cc/paper/4824-imagenet-classification-w>.*

Sermanet et al., Convolutional Neural Networks applied to House Numbers Digit Classification, Nov. 11-15, 2012 [retrieved Mar. 25, 2016], 2012 21st International Conference on Pattern Recognition,pp. 3288-3291. Retrieved from the Internet: <URL: http://ieeexplore.ieee.org/xpls/abs_all.jsp?arnumber=6460867>.*

Ciregan et al., Multi-col. Deep Neural Networks for Image Classification, Jun. 16-21, 2012 [retrieved Mar. 25, 2016], 2012 IEEE Conference on Computer Vision and Pattern Recognition, pp. 3642-3649. Retrieved from the Internet<URL: http://ieeexplore.ieee.org/xpls/abs_all.jsp?arnumber=6248110>.*

Gutstein et al., Latent Learning—What your net also learned, Jul. 31-Aug. 5, 2011 [retrieved Sep. 7, 2016], The 2011 International Joint Conference on Neural Networks, pp. 1316-1321. Retrieved from the Internet: http://ieeexplore.ieee.org/document/6033376/?arnumber=6033376.*

Ciresan, et al., "Multi-Column Deep Neural Networks for Image Classification," Techical Report No. IDSIA-04-12, Feb. 2012; Dalle Molle Institute for Artificial Intelligence, Galleria 2, Switzerland, pp. 1-19.

Lisin et al., "Combining Local and Global Image Features for Object Class Recognition," Proceedings of IEEE Workshop on Learning in Computer Vision and Pattern Recognition (in conjunction with CVPR), San Diego, CA, Jun. 2005, pp. 1-8.

Ciresan, et al., "Multi-Column Deep Neural Network for Traffic Sign Classification," Preprint submitted to Neural Networks, Jan. 23, 2012, pp. 1-15.

Preinterview First Action Interview, dated Dec. 3, 2015, in related U.S. Appl. No. 14/447,290, 56 pp.

First Action Interview Office Action dated Mar. 30, 2016 in U.S. Appl. No. 14/447,290, 6 pages.

Notice of Allowance dated Sep. 29, 2016 in U.S. Appl. No. 14/447,290, 10 pages.

Lu, Xin et al., "Rapid: Rating Pictorial Aesthetics using Deep Learning", In Proceedings of the 22nd ACM International Conference on Multimedia, Nov. 3-7, 2014, pp. 457-466.

F. Agostinelli, M. Anderson, and H. Lee. Adaptive multi-column deep neural networks with application to robust image denoising. In Advances in Neural Information Processing Systems, pp. 1493-1501. 2013.

Y. Sun, X. Wang, and X. Tang. Hybrid deep learning for face verification. In the IEEE International Conference on Computer Vision (ICCV), 2013.

S. Bhallacharya, R. Sukthankar, and M. Shah. A framework for photo-quality assessment and enhancement based on visual aesthetics. In ACM International Conference on Multimedia (MM), pp. 271-280, 2010.

R. Collobert and J. Weston. A unified architecture for natural language processing: Deep neural networks with multitask learning. In International Conference on Machine Learning, pp. 160-167, 2008.

R. Datta, D. Joshi, J. Li, and J. Wang. Studying aesthetics in photographic images using a computational approach. In European Conference on Computer Vision (ECCV), pp. 288-301, 2006.

S. Dhar, V. Ordonez, and T. Berg. High level describable attributes for predicting aesthetics and interestingness. In IEEE Conference on Computer Vision and Pattern Recognition (CVPR), pp. 1657-1664, Jun. 2011.

G. Hinton. Training products of experts by minimizing contrastive divergence. Neural Computation, 14(8):1771-1800, 2002.

G. E Hinton, S. Osindero, and Y.-W. Teh. A fast learning algorithm for deep belief nets. Neural Computation, 18 (7):1527-1554, 2006.

D. Joshi, R. R Datta, E. E Fedorovskaya, Q. T. Luong, J. Z. Wang, J. Li, and J. B. Luo. Aesthetics and emotions in images. In IEEE Signal Processing Magazine, 2011.

Y. Ke, X Tang, and F. Jing. The design of high-level features for photo quality assessment. In IEEE Conference on Computer Vision and Pattern Recognition (CVPR), vol. 1, pp. 419-426, 2006.

Y. LeCun, L. L Bottou, Y. Bengio, and P. Haffner. Gradient-based learning applied to document recognition. In Proceedings of the IEEE, pp. 2278-2324, 1998.

D. Lowe. Distinctive image features from scale-invariant keypoints. International Journal of Computer Vision (IJCV), 60(2):91-110, 2004.

W. Luo, X. Wang, and X. Tang. Content-based photo quality assessment. In IEEE International Conference on Computer Vision (ICCV), pp. 2206-2213, 2011.

Y. Luo and X. Tang. Photo and video quality evaluation: Focusing on the subject. In European Conference on Computer Vision (ECCV), pp. 386-399, 2008.

L. Marchesotti and F. Perronnin. Learning beautiful (and ugly) attributes. In British Machine Vision Conference (BMVC), 2013.

L. Marchesotti, F. Perronnin, D. Larlus, and G. Csurka. Assessing the aesthetic quality of photographs using generic Image descriptors. In IEEE International Conference on Computer Vision (ICCV), pp. 1784-1791, 2011.

N. Murray, L. Marchesotti, and F. Perronnin. AVA: A large-scale database for aesthetic visual analysis. In IEEE Conference on Computer Vision and Pattern Recognition (CVPR), pp. 2408-2415, 2012.

W. Niekamp. An exploratory investigation into factors affecting visual balance. In Educational Communication and Technology: A Journal of Theory, Research, and Development, vol. 29, pp. 37-48, 1981.

M. Nishiyama, T. Okabe, I. Sato, and Y. Sato. Aesthetic quality classification of photographs based on color harmony. In IEEE Conference on Computer Vision and Pattern Recognition (CVPR), pp. 33-40, 2011.

(56) References Cited

OTHER PUBLICATIONS

P. O'Donovan, A. Agarwala, and A. Hertzmann. Color compatibility from large datasets. ACM Transactions on Graphics (TOG), 30(4):63:1-63:12, 2011.
A. Oliva and Torralba. Modeling the shape of the scene: A holistic representation of the spatial envelope. International Journal of Computer Vision (IJCV), 42(3):145-175, 2001.
J. Pan and Q. Yang. A survey on transfer learning. IEEE Transactions on Knowledge and Data Engineering (TKDE), 22(10):1345-1359, 2010.
P. Sermanet, K. Kavukcuoglu, S. Chintala, and Y. LeCun. Pedestrian detection with unsupervised multi-stage features learning. In IEEE Conference on Computer Vision and Pattern Recognition (CVPR), pp. 3626-3633, 2013.
H.-H. Su, T.-W. Chen, C.-C. Kao, W. Hsu, and S.-Y. Chien. Scenic photo quality assessment with bag of aesthetics-preserving features. In ACM International Conference on Multimedia (MM), pp. 1213-1216, 2011.

\* cited by examiner

LEARNING IMAGE CATEGORIZATION USING RELATED ATTRIBUTES

CROSS REFERENCE TO RELATED APPLICATIONS

This application is related to commonly assigned U.S. patent applications entitled "Image Assessment Using Deep Convolutional Neural Networks" Ser. No. 14/447,290, filed concurrently herewith on the same date.

BACKGROUND

Automated assessment or rating of image features has many applications. In image retrieval systems, the ranking algorithm can incorporate feature quality as one of the ranking factors. For picture editing software, feature quality may improve the overall editing process and produce more appealing and polished photographs. Existing methods utilize machine learning and statistical modeling techniques on hand-crafted features or generic image descriptors.

While handcrafted features are often inspired from photography or psychology literature, they share some known limitations. In particular, aesthetics-sensitive attributes are manually designed and have limited scope. Some effective attributes may not be discovered through this process. Further, because of the vagueness of certain photographic or psychologic rules and the difficulty in implementing them computationally, these handcrafted features are often merely approximations of such rules. There is a lack of a principled approach to improve the effectiveness of such features.

Generic image features have been proposed to address the limitations of handcrafted features. They use well-designed but more generic image features including scale-invariant feature transform (SIFT) and Fisher Vector. However, because they are meant to be generic, they are unable to attain the upper performance limits in feature-related problems.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention relate to providing image assessment utilizing regularized double-column convolutional neural networks (RDCNNs). An RDCNN is implemented that is trained to classify image features for a set of images. An image is received from the set of images. Parameters of a first feature column of the RDCNN are fixed. Attributes of the image in the first feature column are utilized to regularize training for a second feature column. A class associated with the second feature column is identified for the image.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted in the Background, a number of methods have been attempted for image assessment systems. However, these systems typically fall short in their usefulness because such systems are limited to utilizing manually designed features that may only be approximations of rules defining the features. Further, even when utilizing generic image features, attaining upper performance limits for problems such as aesthetics categorization may not be possible. For example, composition and pictorial balance are two highly relevant factors for aesthetic quality. Popular composition principles include the rule of thirds, diagonal lines, and golden ratio. Pictorial balance may be affected by position, form, size, tone, color, brightness, contrast, and proximity to the fulcrum. These patterns are either abstract or not well defined making it extremely difficult to calculate these features to assess image aesthetic quality.

Convolutional neural networks (CNN) may be leveraged to automatically identify patterns and employ learned visual features to rate and categorize the aesthetic quality of images. Unfortunately, applying CNN to the aesthetic quality categorization task is not straightforward. Images are of different aspect ratios and resolutions and image details in the original high-resolution may be important. This makes it difficult to use the images for training CNN because CNN typically requires inputs to be normalized to the same size and aspect ratio.

Embodiments of the present invention are generally directed to providing automatic feature learning and image assessment using deep convolutional neural networks. Several different representations of an image may be captured and can be encoded by jointly considering the heterogeneous representations. A local image representation (e.g., a local or fine-grained view) includes randomly cropped inputs from the original high-resolution image. A global image representation (e.g., global view) is represented by normalized inputs and may include center-crop, warp, and padding. Each of the representations may be utilized to individually train a single-column CNN (SCNN) to assess image features. A DCNN comprising multiple convolutional and fully connected layers may utilize the heterogeneous inputs from one image to identify visual features in terms of both global and local views. After several layers of transformations, the two columns of the DCNN are merged to form the final classifier. Additionally, features of the images may be learned in one of the fully connected layers. Features of the images may be leveraged to boost classification accuracy of other features by learning a regularized DCNN (RDCNN).

Figure 1:
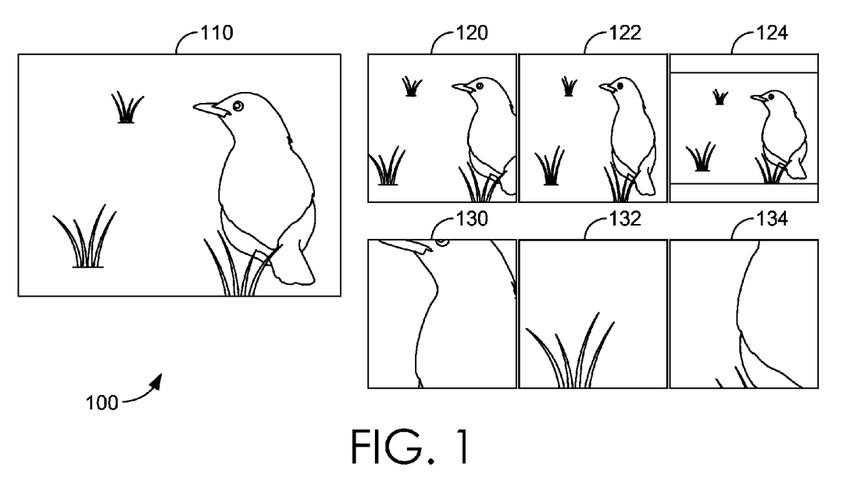
FIG. 1 is an exemplary diagram of an original image as well as various global and local representations in accordance with embodiments of the present invention.

Referring now to FIG. 1, an exemplary diagram 100 of an original image 110 as well as various global and local representations in accordance with embodiments of the present invention is depicted. Several different transformations may be considered to normalize image sizes utilizing the original high-resolution image 110 to create a global view or global input. A center-crop ($g_c$) transformation 120 isotropically resizes the original image 110. A warp ($g_w$) transformation 122 anisotropically resizes (warps) the original image 110. A padding ($g_p$) transformation 124 resizes the original image 110 by padding border pixels.

Figure 2:
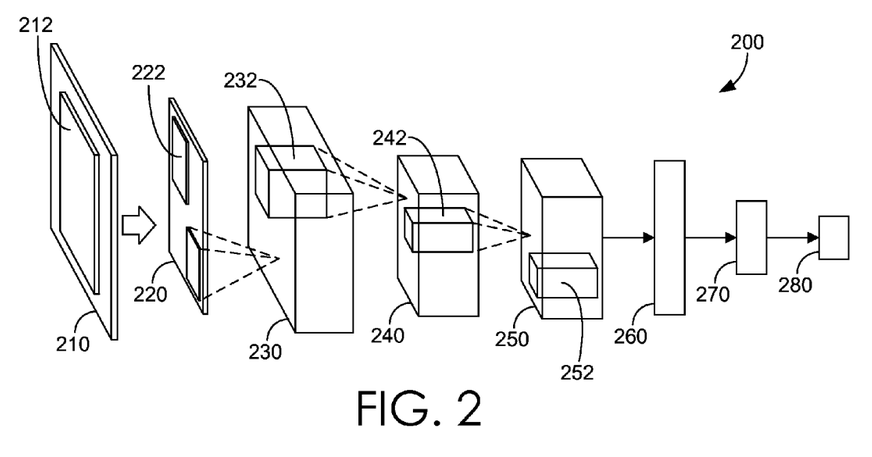
FIG. 2 is an exemplary diagram of a single-column convolutional neural network architecture in accordance with an embodiment of the present invention.

An exemplary architecture of SCNN 200 used for aesthetic quality assessment is illustrated in FIG. 2. The same or similar architecture may be used for other feature assessment such as, for example, style or scene. As illustrated, the architecture of SCNN 200 may include an input patch 212 randomly cropped from a normalized input 210, four convolutional layers 220, 230, 240, 250 and two fully connected layers 260, 270. Each of the convolutional layers 220, 230, 240, 250 filters the output 222, 232, 242, 252 of the previous layer. The last layer 280 is trained to, in the case of aesthetic quality categorization, provide a binary aesthetic label. For other categorizations, such as image style, the last layer 280 of SCNN may be trained to provide a multi-class categorization.

Figure 3:
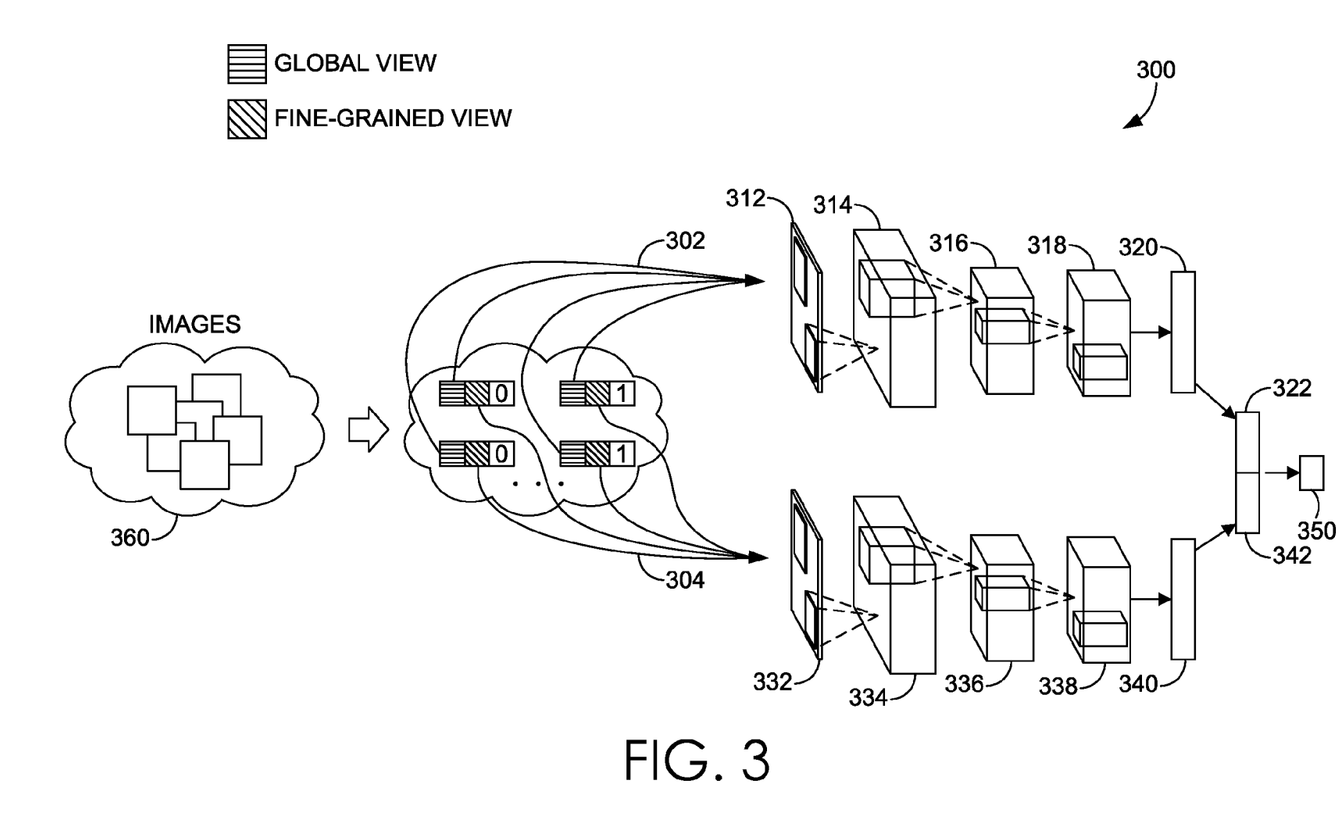
FIG. 3 is an exemplary diagram of a double-column convolutional neural network system in accordance with an embodiment of the present invention.

In FIG. 3, an exemplary diagram of a DCNN system 300 in accordance with an embodiment of the present invention is depicted. For each image selected from the images 360, the global information or local information may be lost when transformed or extracted to a normalized input. Accordingly, the image may be represented through multiple inputs. One input may represent the global view of an image and another input may represent the local or fine-grained view of the image. A DCNN may support automatic feature learning with heterogeneous inputs (i.e., a global view input and a local- or fine-grained view input).

As illustrated in FIG. 3, networks in different columns 310, 320 are independent in convolutional layers 312, 314, 316, 318, 332, 334, 336, 338 and the first two fully connected layers 320, 322, 340, 342. The inputs of the two columns may be a global view input 302 and a fine-grained view input 304. The DCNN system 300 may be expanded to a multi-column convolutional network by incorporating additional types of normalized inputs. The DCNN system 300 may additionally allow different architectures in individual networks to facilitate parameter learning for networks in different columns. In the DCNN system 300 as illustrated and described herein, the network architectures are the same for both columns. Given a test image, a feature, such as aesthetic quality, may be evaluated and provided in the last layer 350 in the same manner as SCNN.

Figure 4:
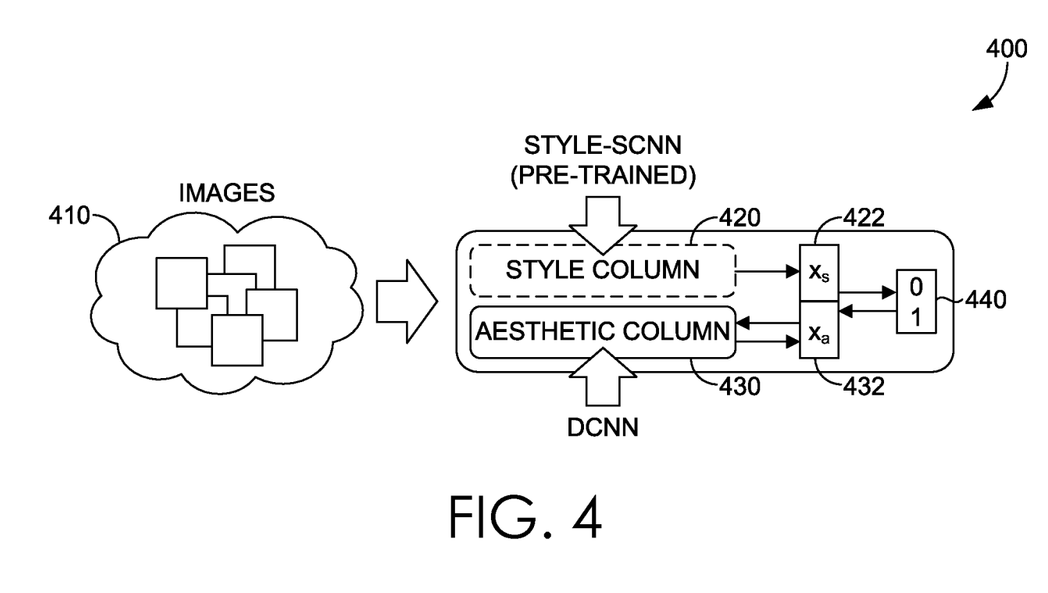
FIG. 4 is an exemplary diagram of a regularized double-column convolutional neural network system in accordance with an embodiment of the present invention.

To facilitate the network training with style attributes of images 410, and referring now to FIG. 4, an exemplary diagram of an RDCNN system 400 in accordance with an embodiment of the present invention is shown. Two normalized inputs of the aesthetic column 430 may be received, as described herein with respect to DCNN. A single input of the style column 420 may be received. During each learning iteration, only the parameters in the aesthetics column 430 are fine-tuned and the learning process is supervised by the aesthetic label 440. In other words, the parameters of the style column 420 are fixed and the style attributes 422 essentially serve as a regularizer for training the aesthetic column 430 to classify the aesthetic attribute 422.

Figure 5:
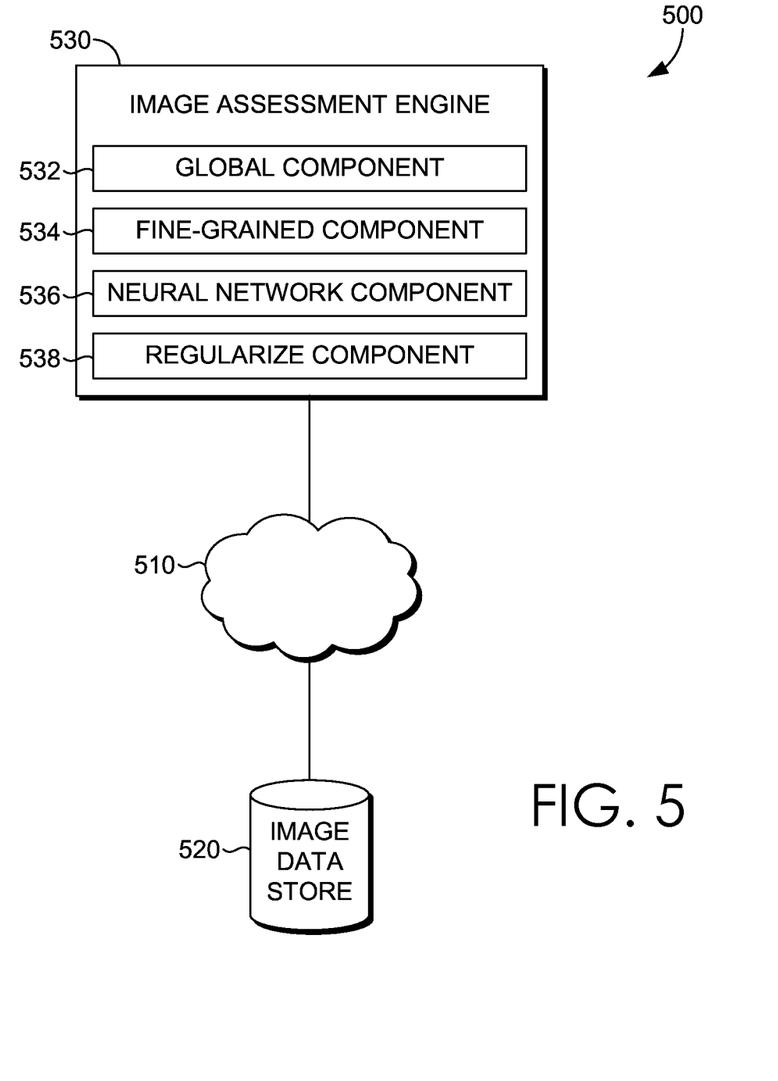
FIG. 5 is a block diagram showing an image assessment system for learning and classifying image features in accordance with embodiments of the present invention.

Turning to FIG. 5, a block diagram is provided that illustrates an image assessment system 500 for learning and classifying image features in accordance with embodiments of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The image assessment system 500 may be implemented via any type of computing device, such as computing device 1000 described below with reference to FIG. 10, for example. In various embodiments, the image assessment system 500 may be implemented via a single device or multiple devices cooperating in a distributed environment.

The image assessment system 500 generally operates to learn and classify features for a set of images. Among other components not shown, the system 500 may include an image data store 520 and an image assessment engine 530. It should be understood that the system 500 shown in FIG. 5 is an example of one suitable computing system architecture. Each of the components shown in FIG. 5 may be implemented via any type of computing device, such as computing device 1000 described with reference to FIG. 10, for example. The components may communicate with each other via a network 510, which may include, without limitation, one or more local area networks (LANs) and/or wide area networks (WANs). Such networking environments are commonplace in offices, enterprise-wide computer networks, intranets, and the Internet. It should be understood that any number of image data stores and image assessment engines may be employed within the system 500 within the scope of the present invention. Each may comprise a single device or multiple devices cooperating in a distributed environment. For instance, the image assessment engine 530 may be provided via multiple devices arranged in a distributed environment that collectively provide the functionality described herein. Additionally, other components not shown may also be included within the network environment.

As shown in FIG. 5, the image assessment system 500 includes an image assessment engine 530 that learns and/or classifies features of images stored in image data store 520. While only a single image data store 520 is shown in FIG. 5, it should be understood that the image assessment system 500 may employ any number of image data stores. The image data store 520 may store images and labels or classes associated with various features of the images. By way of example only and not limitation, the features may include aesthetics categorization, style, scene and the like. Each of these features may be utilized by the image assessment system 500 to learn and/or classify other features associated with the images.

Referring still to FIG. 5, the image assessment engine 530 includes, among other things not shown, a global component 532, a fine-grained component 534, a neural network component 536, and a regularize component 538. The image assessment engine 530 initially receives one or more images from an image data store 520 via network 510. As mentioned, the images may include classifier labels (or classes) for various features. The images may additionally or alternatively be associated with features that are not labeled.

Several different transformations may be considered to normalize image sizes utilizing the original high-resolution image. A center-crop ($g_c$) transformation isotropically resizes the original image by normalizing its shorter size to a fixed length s (which is set to 256 as described in detail below) and center-crop the normalized input to generate a s×s×3 input. A warp ($g_w$) transformation anisotropically resizes (warps) the original image into a normalized input with a fixed size (s×s×3). A padding ($g_p$) transformation resizes the original image by normalizing the longer side of the image to a fixed length s and generates a normalized input of a fixed size s×s×3 by padding border pixels with zero.

For each image I and each type of transformations, an s×s×3 input $I_g^j$ with transformation of $g_j$, where j∈{c, w, p}. Resizing inputs may cause information loss (i.e., the high-resolution local views) for aesthetic assessment. Accordingly, randomly sampled fixed size (s×s×3) crops with the transformation $I_r^2$ are also utilized. This results in normalized inputs $I_l^r$ (r is an index of normalized inputs for each random cropping) which preserve the local views of an image with details from the original high-resolution image. These normalized inputs $I_t \in \{I_g^c, I_g^w, I_g^p, I_l^r\}$ are utilized for CNN training.

Global component 532 is configured to extract a global image representation of an image as a global input to a first column of the DCNN. The global view of an image may be extracted via the transformations of $g_c$, $g_w$, $g_p$. Among the three global views, $I_g^w$ and $I_g^p$ maintain the relative spatial layout among elements in the original image. $I_g^w$ and $I_g^p$ also follow the rule of thirds whereas $I_g^c$ fails to do so.

Fine-grained component 534 is configured to extract a local image representation of the image as a fine-grained input to a second column of the DCNN. The local views of the original image are represented by the randomly cropped patches $\{I_l^r\}$. These patches depict the local details in the original resolution of the image.

Neural network component 536 is configured to implement a DCNN to train the DCNN to learn and classify features for a set of images. The DCNN may support automatic feature learning with heterogeneous inputs (i.e., a global view input and a local- or fine-grained view input). The inputs of the two columns may be $I_g^w$, corresponding to the global view input, and $I_l^r$, corresponding to the fine-grained view input.

By setting s as 256, the size of $I_t$ is 256×256×3. To alleviate overfitting in network training, for each normalized input $I_t$, a random 224×224×3 patch $I_p$ or its horizontal reflection is extracted to be the input patch to the network. The DCNN may include four convolutional layers, including a first convolutional layer that filters the 224×224×3 patch with 64 kernels of size 11×11×3 with a stride of two pixels. A second convolutional layer may filter the output of the first convolutional layer with 64 kernels of size 5×5×64. Each of the third and fourth convolutional layers may have 64 kernels of size 3×3×64.

Neural network component 536 is further configured to merge at least one layer of the first column with at least one layer of the second column into a fully connected layer. The fully connected layers may have 1000 and 256 neurons respectively. Neural network component 536 is further configured to learn or classify at least one feature for the image. The 256×1 vectors may be concatenated from each of the fc256 layers and the weights may be jointly trained in the final layer. Interaction between the two columns in convolutional layers of the DCNN is avoided because they are in different spatial scales.

For the input patch $I_p$ of the i-th image, a feature representation $x_i$ and the label $y_i \in C$ may be extracted from layer fc256 (the outcome of the convolutional layers and the fc1000 layer). The training of the last layer may be accomplished by maximizing the following log likelihood function: $l(W)=\Sigma_{i=1}^{N} \Sigma_{c \in C} \Pi(y_i=c) \log p(y_i=c|x_i, w_c)$ where N is the number of images, $W=\{w_c\}_c \in C$ is the set of model parameters, and $\Pi(x)=1$ if and only if x is true and vice versa. The probability $p(y_i=c|x_i, w_c)$ is expressed as:

$$p(y_i = c \mid x_i, w_c) = \frac{\exp(w_c^T x_i)}{\sum_{c' \in C} \exp(w_{c'}^T x_i)}.$$

In the case of aesthetic quality categorization, each input patch is associated with an aesthetic label $c \in C=\{0,1\}$. For other categorizations, such as image style, the neural network component 536 may utilize a multi-class categorization.

In an embodiment, regularize component 538 is configured to implement an RDCNN that is trained to classify image features for a set of images, such as the RDCNN described herein. Parameters of a first feature column of the RDCNN are fixed. Attributes of the image in the first feature column are utilized to regularize training for a second feature column. In this embodiment, neural network component 536 is further configured to identify a class associated with the second feature column for the image.

Regularize component 538 may utilize labels for training images to help identify other feature characteristics. Because discrete labels (i.e., high and low) may be utilized, such as for learning and classifying aesthetics, the network may not converge properly due to the large intra-class variation. Accordingly, additional labels for training images may be utilized to help identify other feature characteristics. For example, style attributes, such as complementary colors, macro, motion blur, rule of thirds, and/or shallow depth of field, may be utilized to help determine the aesthetic quality of images because they are regarded as highly relevant attributes.

There are two natural ways to formulate the problem. One is to leverage the concept of multi-task learning, which jointly constructs feature representation and minimizes the classification error for both labels. Assuming we have aesthetic quality labels $\{y_{ai}\}$ and style labels $\{y_{si}\}$ for all training images, the following optimization problem may be solved: $\max_{x,w_a,w_s} \Sigma_{i=1}^{N} (\Sigma_{c \in C_A} \Pi(y_{ai}=c) \log p(y_{ai}|x_i,w_{ac}) + \Sigma_{c \in C_S} \Pi(y_{si}=c) \log p(y_{si}|x_i,w_{sc}))$, where X provides the features of all training images, $C_A$ is the label set for aesthetic quality, $C_S$ is the label set for style, and $W_a\{w_{ac}\}c \in C_A$ and $W_S = \{w_{sc}\}c \in C_S$ are the model parameters.

In some instances, only a limited number of images with a particular attribute may be available. For example, in the Aesthetic Visual Analysis (AVA) dataset, approximately 230,000 images include aesthetic labels, but only 14,000 of these images also have style labels. In these instances, because of the missing labels, it is not practical to jointly perform aesthetics categorization and style classification with a single neural network. Instead, regularize component 536 can minimize classification error for one label by first training a style classifier. The style attributes can then be extracted for all training images. Next, those attributes can be applied by regularize component 536 to regularize the feature learning and classifier training.

The style classifier may be trained by utilizing the SCNN or DCNN as described above. Although a similar architecture may be used, the number of filters in the various convolutional layers may vary. In the style example, the number of filters in the first and fourth convolutional layers may be reduced to one half, primarily due to the reduced number of training images. In style SCNN or DCNN, the same log likelihood function described above is maximized, where C is the set of style labels in the AVA dataset. Given an image, the learned weights may be applied and the features may be extracted from the fc256 layer as its style attribute.

Regularize component 536 may utilize two normalized inputs of the aesthetic column $I_g^w$ and $I_l^r$, as described above with respect to DCNN. The input of the style column may be $I_l^r$. Regularize component 536 trains RDCNN by solving the following optimization problem: $\max_{x_z,w_a} \Sigma_{i=1}^{N} (\Sigma_{c=1 \in C_a} \Pi (y_{ai}=c) \log p (y_{ai}|x_{ai},x_{si},w_{ac})$ where $x_{si}$ are the style attributes of the i-th training image and $x_{ai}$ are the features to be learned. Regularize component 536 fine-tunes the parameters in the aesthetics column and the learning process is supervised by the aesthetic label. Regularize component 536 fixes the parameters of the style column and the style attributes $x_{si}$ essentially serve as a regularizer for training the aesthetic column.

Figure 6:
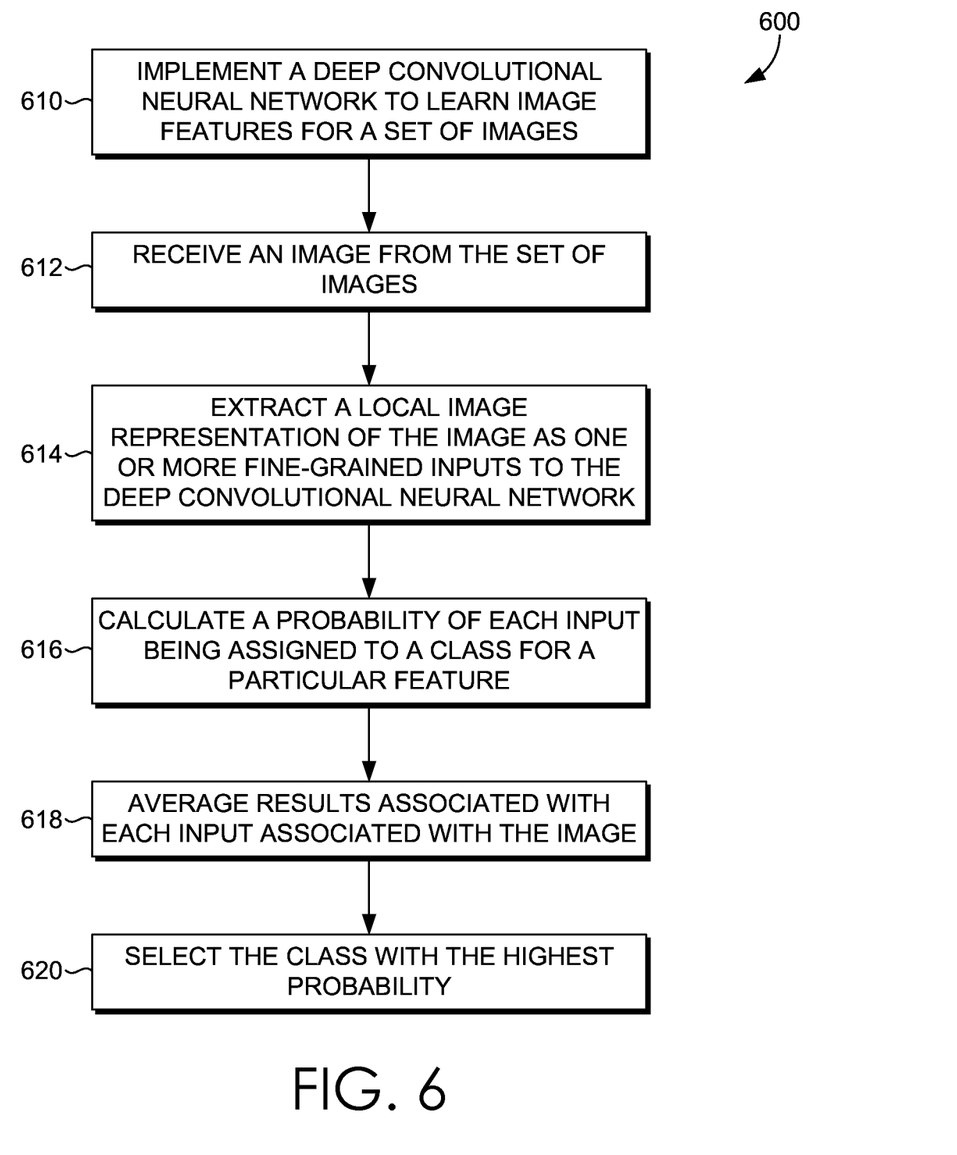
FIG. 6 is a flow diagram showing a method for classifying a feature for an image utilizing a deep convolutional neural network in accordance with an embodiment of the present invention.

In FIG. 6, a flow diagram is provided that illustrates a method 600 for classifying a feature for an image utilizing a deep convolutional neural network in accordance with an embodiment of the present invention. The method 600 may be performed, for instance, image assessment engine 500 of FIG. 5. As shown at step 610, a deep convolutional neural network is implemented that is trained to learn and classify image features for a set of images. The features may include aesthetics, style, or scene. An image is received, at step 612, from the set of images.

A local image representation of the image is extracted as one or more fine-grained inputs to the deep convolutional neural network, at step 614. The local image representation may be extracted by randomly cropping the image into a normalized input with a fixed size to create the local image representation. As can be appreciated, a number of normalized inputs can be created from a single image which may assist in training the network when only limited images are available. The local image representation preserves details of the image in original high-resolution format.

In one embodiment, a global image representation of the image is extracted as one or more global inputs to the deep convolutional neural network comprising a first column and a second column. In this regard, the first column is associated with the global input and the second column is associated with the fine-grained input. The first column and the second column may be merged to form a deep neural network classifier.

In one embodiment, an architecture associated with each column in the DCNN is the same for each column. In another embodiment, an architecture associated with each column in the double-column convolutional neural network is different for each column. One or more additional columns may be added with additional normalized inputs to form a multi-column convolutional neural network. In one embodiment, the architecture associated with each column in the deep convolutional neural network comprises: a first convolutional layer that filters a 224×224×3 patch with 64 kernels of size 11×11×3 with a stride of 2 pixels; a second convolutional layer that filters output of the first convolutional layer with 64 kernels of size 5×5×64; a third convolutional and fourth convolutional layer, each having 64 kernels of size 3×3×64; and two fully-connected layers having 1000 and 256 neurons respectively.

The image may be resized to create the global image representation. For example, the image may be resized, as described herein, by warping the image into a normalized input with a fixed size. In another example, the image may be resized, as described herein, by normalizing its shorter side to a normalized input with a fixed length s and center-cropping the normalized input to generate a s×s×3 input. In yet another example, the image may be resized, as described herein, by normalizing a longer side of the image to a fixed length s and generating a normalized input of a fixed size s×s×3 by padding border pixels with zero.

At step 616, a probability of each input being assigned to a class for a particular feature is calculated. Resulted associated with each input associated with the image are averaged, at step 618. At step 620, the class with the highest probability is selected. In one embodiment, one or more features may be extracted from the image at one of the fully-connected layers. In one embodiment, the last layer of the deep convolutional neural network may be replaced with a regression (i.e., a continuous output between 0 and 1). In this instance, the cost function is the sum of $L^2$ distance between the predicted network output NN(x) and the ground truth label y.

Figure 7:
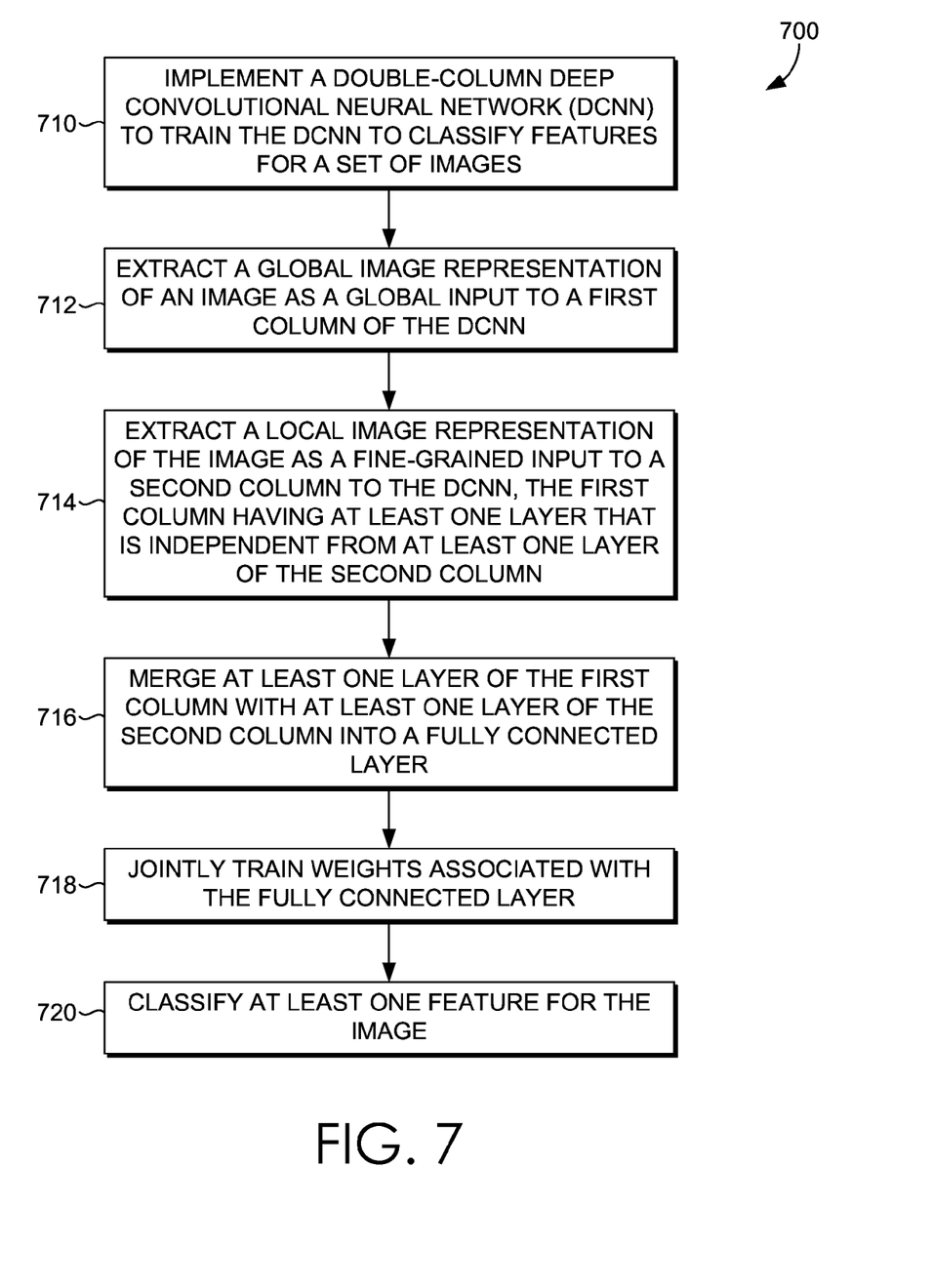
FIG. 7 is a flow diagram showing a method for classifying a feature for an image utilizing a double-column deep convolutional neural network in accordance with an embodiment of the present invention.

Turning to FIG. 7, a flow diagram is provided that illustrates a method 700 for classifying a feature for an image utilizing a DCNN in accordance with an embodiment of the present invention. The method 700 may be performed, for instance, image assessment engine 500 of FIG. 5. As shown at step 710, a DCNN is implemented that is trained to learn and classify features for a set of images.

A global image representation of an image is extracted, at step 712, as a global input to a first column of the DCNN. At step 714, a local image representation of the image is extracted as a fine-grained input to a second column of the DCNN. As described herein, the first column has at least one layer that is independent from at least one layer of the second column. At step 716, at least one layer of the first column is merged with at least one layer of the second column into a fully connected layer. Weights associated with the fully connected layer are jointly trained at step 718. At least one feature for the image is classified at step 720.

In one embodiment, global and local features of an image are automatically discovered from the fully connected layer and a layer immediately preceding the fully connected layer. In one embodiment, error is back propagated in each column with stochastic gradient descent. In one embodiment, one or more additional columns with additional normalized inputs are added to form a multi-column convolutional neural network.

Figure 8:
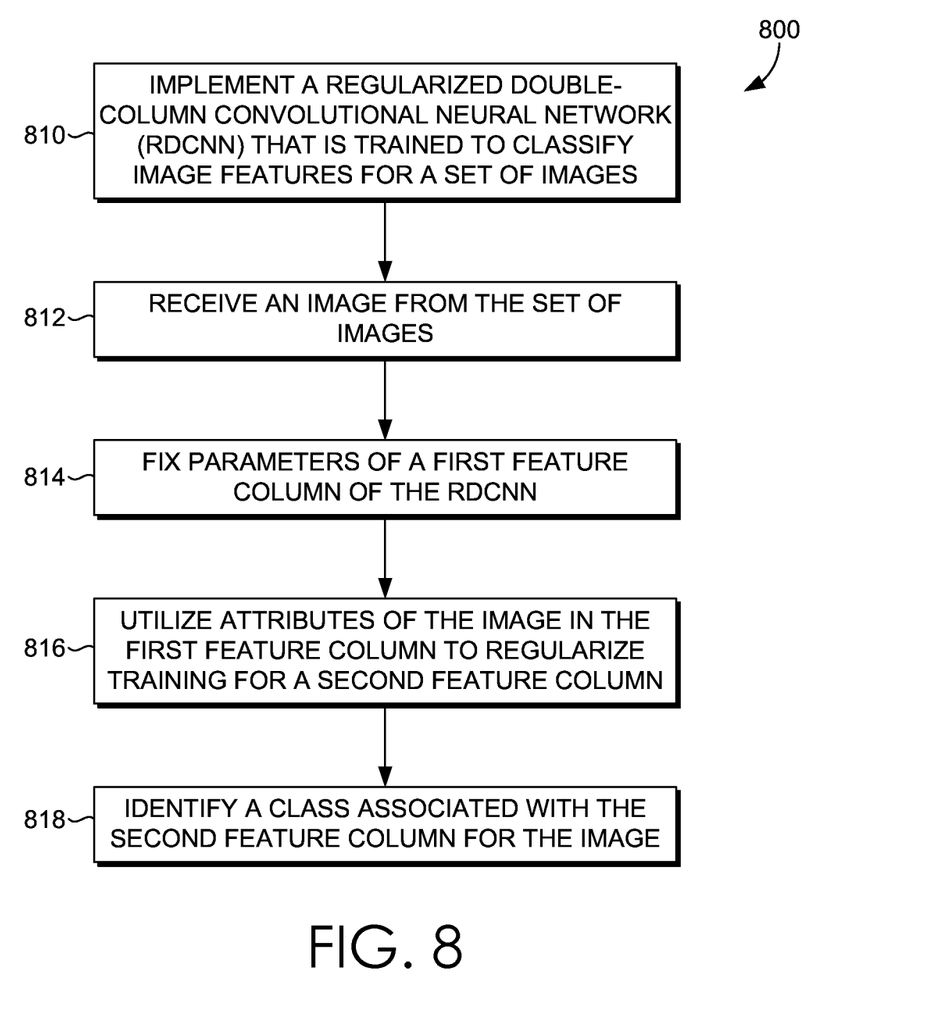
FIG. 8 is a flow diagram showing a method for classifying a feature for an image utilizing a regularized double-column deep convolutional neural network in accordance with an embodiment of the present invention.

Referring now to FIG. 8, a flow diagram is provided that illustrates a method 800 for classifying a feature for an image utilizing a regularized double-column deep convolutional neural network in accordance with an embodiment of the present invention. The method 800 may be performed, for instance, image assessment engine 500 of FIG. 5. As shown at step 810, a RDCNN is implemented that is trained to classify image features for a set of images.

An image is received, at step 812, from the set of images. In one embodiment, a global image representation of the image is extracted as one or more global inputs to a second feature column of the RDCNN. The image may be resized to create the global image representation. In one embodiment, the image is resized by warping the image into a normalized input with a fixed size. In one embodiment, the image is resized by normalizing its shorter side to a normalized input with a fixed length s and center-cropping the normalized input to generate a s×s×3 input. In one embodiment, the image is resized by normalizing a longer side of the image to a fixed length s and generating a normalized input of a fixed size s×s×3 by padding border pixels with zero.

In one embodiment, a local image representation of the image is extracted as one or more fine-grained inputs to the second feature column of the RDCNN. The local image representation of the image may also be extracted as an input to a first feature column of the RDCNN. The image may be randomly cropped into a normalized input for local image representation for the first feature column and second feature column. The normalized input may have a fixed size and preserve details of the image in original high-resolution format.

Parameters of a first feature column of the RDCNN are fixed, at step 814. The first feature column may be a style column. Styles associated with the style column may include rule-of-thirds, high dynamic range, black and white, long exposure, complementary colors, vanishing point, and soft focus. Attributes of the image in the first feature column are utilized, at step 816, to regularize training for a second feature column. The second feature column may be an aesthetics column. At step 818, a class associated with the second feature column for the image is identified.

An architecture associated with each column in the RDCNN may comprise: a first convolutional layer that filters a 224×224×3 patch with 64 kernels of size 11×11×3 with a stride of 2 pixels; a second convolutional layer that filters output of the first convolutional layer with 64 kernels of size 5×5×64; a third convolutional and fourth convolutional layer, each having 64 kernels of size 3×3×64; and two fully-connected layers having 1000 and 256 neurons respectively. A last layer of the RDCNN may be replaced with a regression. In this instance, the cost function is the sum of $L^2$ distance between the predicted network output NN(x) and the ground truth label y.

Figure 9:
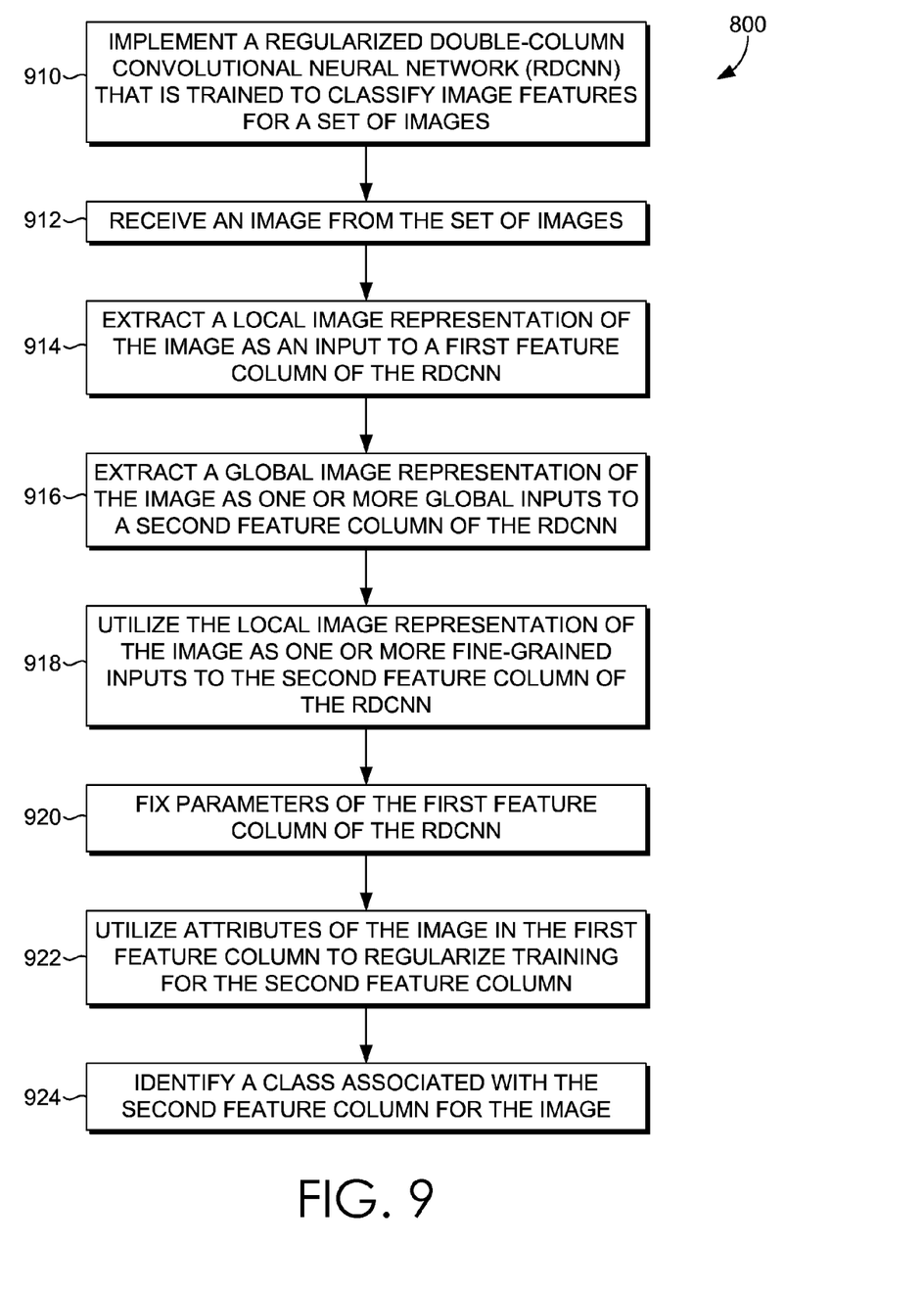
FIG. 9 is a flow diagram showing a method for classifying a feature for an image utilizing a regularized double-column deep convolutional neural network in accordance with an embodiment of the present invention.

In FIG. 9, a flow diagram is provided that illustrates a method 900 for classifying a feature for an image utilizing a regularized double-column deep convolutional neural network in accordance with an embodiment of the present invention. The method 900 may be performed, for instance, image assessment engine 500 of FIG. 5. As shown at step 910, an RDCNN is implemented that is trained to classify image features for a set of images.

An image is received, at step 912, from the set of images. A local image representation of the image is extracted, at step 914, as an input to a first feature column of the RDCNN. The first feature column is associated with style. Styles associated with the style column may include rule-of-thirds, high dynamic range, black and white, long exposure, complementary colors, vanishing point, and soft focus.

A global image representation of the image is extracted, at step 916, as one or more global inputs to a second feature column of the RDCNN. In one embodiment, the image is resized to create the global image representation. In one embodiment, the image is resized by warping the image into a normalized input with a fixed size. The second feature column is associated with aesthetics.

The local image representation of the image is utilized, at step 918, as one or more fine-grained inputs to the second feature column of the RDCNN. The image may be randomly cropped into a normalized input for the local image representation for the first feature column and second feature column. The normalized input may have a fixed size and preserve details of the image in original high-resolution format.

At step 920, parameters of the first feature column of the RDCNN are fixed. Attributes of the image in the first feature column are utilized to regularize training for the second feature column at step 922. A class associated with the second feature column is identified, at step 924, for the image.

Figure 10:
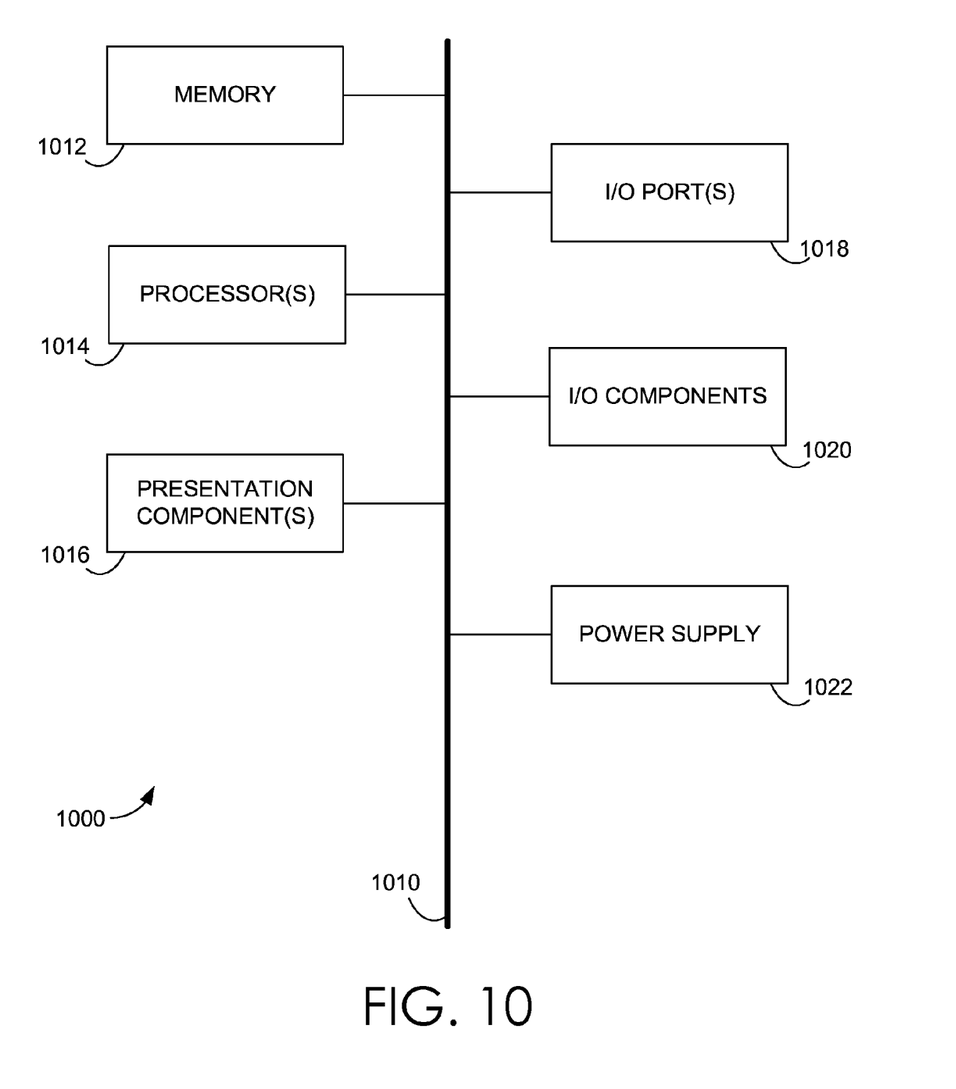
FIG. 10 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/ output (I/O) ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as, stereoscopic camera systems, infrared camera systems, RGB camera systems, and combinations of these for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for an objective approach for determining the visual similarity between fonts. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium comprising computer-useable instructions that, when used by one or more computing devices, cause the one or more computing devices to perform operations comprising:
   implementing a regularized double-column convolutional neural network (RDCNN) to classify image features for a set of images, the implementing comprising:
   receiving an image from the set of images;
   training a first feature column in a first neural network of the RDCNN using a first set of image representations as inputs to the first feature column, the trained first feature column having fixed parameters;
   generating a first set of image attributes by the trained first feature column using the fixed parameters; and
   training a second feature multi-column in a second neural network of the RDCNN using the generated first set of image attributes, wherein the parameters of the trained first feature column remain fixed, wherein the second feature multi-column comprises at least two columns that are independent in each convolutional layer of the second feature multi-column, and
   wherein each of the at least two columns receives a different input; and
   identifying a class associated with the second feature multi-column for the image using the implemented RDCNN.

2. The non-transitory computer storage medium of claim 1, further comprising extracting a global image representation of the image as one or more global inputs to the second feature multi-column of the RDCNN.

3. The non-transitory computer storage medium of claim 1, further comprising extracting a local image representation of the image as one or more fine-grained inputs to the second feature multi-column of the RDCNN.

4. The non-transitory computer storage medium of claim 3, comprising extracting a local image representation of the image as an input to the first feature column of the RDCNN.

5. The non-transitory computer storage medium of claim 2, wherein the global image representation is extracted by resizing the image.

6. The non-transitory computer storage medium of claim 2, wherein the global image representation is extracted by warping the image into a normalized input with a fixed size.

7. The non-transitory computer storage medium of claim 2, wherein the global image representation is extracted by normalizing a shorter side of the image to a normalized input with a fixed length S and center-cropping the normalized input to generate a s×s×3 input.

8. The non-transitory computer storage medium of claim 2, wherein the global image representation is extracted by normalizing a longer side of the image to a fixed length S and generating a normalized input of a fixed size s×s×3 by padding border pixels with zero.

9. The non-transitory computer storage medium of claim 4, further comprising randomly cropping the image into a normalized input for local image representation for the first feature column and second feature multi-column, the normalized input having a fixed size and preserving details of the image in original high-resolution format.

10. The non-transitory computer storage medium of claim 1, wherein the first feature column is a style column.

11. The non-transitory computer storage medium of claim 10, wherein styles associated with the style column include rule-of-thirds, high dynamic range, black and white, long exposure, complementary colors, vanishing point, and soft focus.

12. The non-transitory computer storage medium of claim 10, wherein the second feature multi-column is an aesthetics column.

13. The non-transitory computer storage medium of claim 1, wherein an architecture associated with each column in the RDCNN comprises at least four convolutional layers and at least two fully-connected layers.

14. The non-transitory computer storage medium of claim 1, further comprising replacing a last layer of the RDCNN with a regression.

15. A computer-implemented method comprising:
implementing a regularized double-column convolutional neural network (RDCNN) to classify image features for a set of images, the implementing comprising:
receiving an image from the set of images;
extracting a local image representation of the image;
training a first feature column in a first neural network of the RDCNN utilizing the extracted local image representation as an input to the first feature column of the RDCNN, the first feature column associated with style and having fixed parameters;
extracting a global image representation of the image; and
training a second feature multi-column in a second neural network of the RDCNN utilizing the fixed parameters of the trained first feature column and utilizing the extracted global image representation as one or more global inputs to the second feature multi-column of the RDCNN, and utilizing the local image representation of the image as one or more fine-grained inputs to the second feature multi-column of the RDCNN, the second feature multi-column associated with aesthetics, wherein the second feature multi-column comprises at least two columns that are independent in each convolutional layer of the second feature multi-column, and each of the at least two columns receives a different input; and
identifying a class associated with the second feature multi-column for the image utilizing the implemented RDCNN.

16. The method of claim 15, further comprising resizing an image to extract the global image representation.

17. The method of claim 15, further comprising warping the image into a normalized input with a fixed size to extract the global image representation.

18. The method of claim 15, further comprising randomly cropping the image into a normalized input for the local image representation for the first feature column and second feature multi-column, the normalized in put having a fixed size and preserving details of the image in original high-resolution format.

19. The method of claim 15, wherein styles associated with the style column include rule-of-thirds, high dynamic range, black and white, long exposure, complementary colors, vanishing point, and soft focus.

20. A computerized system comprising:
one or more processors; and
one or more computer storage media storing computer-useable instructions that, when used by the one or more processors, cause the one or more processors to:
implement a regularized double-column convolutional neural network (RDCNN) to classify image features for a set of images, the implementing to:
receive an image from the set of images;
train a first feature column in a first neural network of the RDCNN using a first set of image representations as inputs to the first feature column, the trained first feature column having fixed parameters; and
train a second feature multi-column in a second neural network of the RDCNN using the fixed parameters of the trained first feature column, and using a second set of image representations as inputs to the second feature multi-column, wherein the second feature multi-column comprises at least two columns that are independent in each convolutional layer of the second feature multi-column, and each of the at least two columns receives a different input; and
identify a class associated with the second feature multi-column for the image using the implemented RDCNN.

* * * * *

UNITED STATES PATENT AND TRADEMARK OFFICE
CERTIFICATE OF CORRECTION

PATENT NO. : 9,953,425 B2
APPLICATION NO. : 14/447296
DATED : April 24, 2018
INVENTOR(S) : Zhe Lin et al.

Page 1 of 1

It is certified that error appears in the above-identified patent and that said Letters Patent is hereby corrected as shown below:

In the Claims

In Column 14, Line 32, Claim 19, delete "style" and insert -- first feature --, therefor.

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*